United States Patent
Singh et al.

(10) Patent No.: US 7,840,783 B1
(45) Date of Patent: Nov. 23, 2010

(54) SYSTEM AND METHOD FOR PERFORMING A REGISTER RENAMING OPERATION UTILIZING HARDWARE WHICH IS CAPABLE OF OPERATING IN AT LEAST TWO MODES UTILIZING REGISTERS OF MULTIPLE WIDTHS

(75) Inventors: Gaurav Singh, Los Altos, CA (US);
Srivatsan Srinivasan, San Jose, CA (US); Ricardo Ramirez, Sunnyvale, CA (US); Wei-Hsiang Chen, Sunnyvale, CA (US); Hai Ngoc Nguyen, Redwood City, CA (US)

(73) Assignee: Netlogic Microsystems, Inc., Mountain View, CA (US)

( * ) Notice: Subject to any disclaimer, the term of this patent is extended or adjusted under 35 U.S.C. 154(b) by 394 days.

(21) Appl. No.: 11/852,916

(22) Filed: Sep. 10, 2007

(51) Int. Cl.
*G06F 9/00* (2006.01)
*G06F 9/44* (2006.01)

(52) U.S. Cl. .................... 712/217; 712/43
(58) Field of Classification Search ............. 712/43, 712/217
See application file for complete search history.

(56) References Cited

U.S. PATENT DOCUMENTS

| | | | |
|---|---|---|---|
| 5,644,780 A * | 7/1997 | Luick | 712/23 |
| 5,860,085 A | 1/1999 | Stormon et al. | 711/108 |
| 6,035,388 A | 3/2000 | Choquette et al. | 712/215 |
| 6,108,227 A | 8/2000 | Voelkel | 365/49 |
| 6,393,552 B1 * | 5/2002 | Eickemeyer et al. | 712/216 |
| 6,594,753 B2 | 7/2003 | Choquette et al. | 712/214 |
| 7,035,968 B1 | 4/2006 | Pereira | 711/108 |
| 7,110,275 B2 | 9/2006 | Park | 365/49 |
| 7,272,684 B1 | 9/2007 | Chou | 711/108 |
| 7,366,830 B1 | 4/2008 | Maheshwari | 711/108 |
| 2005/0055540 A1 | 3/2005 | Hass et al. | 712/214 |
| 2006/0005200 A1 * | 1/2006 | Vega et al. | 718/108 |
| 2008/0155189 A1 | 6/2008 | Maheshwari | 711/108 |

OTHER PUBLICATIONS

Hennessy et al., "Computer Architecture, A Quantitative Approach", 1996, Section 8.5.*
Raymond Filiatreault, "Simply FPU", Chap. 1, 2003.*
Huffman et al., "MIPSproTM Assembly Language Programmer's Guide", pp. 29-34, 2003.*

* cited by examiner

*Primary Examiner*—Chun-Kuan Lee
*Assistant Examiner*—Jesse R Moll
(74) *Attorney, Agent, or Firm*—Vista IP Law Group LLP

(57) ABSTRACT

A system, method, and computer program product are provided for performing a register renaming operation utilizing hardware which operates in at least two modes. In operation, hardware is operated in at least two modes including a first mode for operating the hardware using a logical register of a first bit width and a second mode for operating the hardware using a logical register of a second bit width. The first bit width is twice a width of the second bit width. Additionally, a register renaming operation is performed, including renaming at least one logical register to at least one physical register of the first bit width, utilizing the hardware.

28 Claims, 8 Drawing Sheets

SYSTEM AND METHOD FOR PERFORMING A REGISTER RENAMING OPERATION UTILIZING HARDWARE WHICH IS CAPABLE OF OPERATING IN AT LEAST TWO MODES UTILIZING REGISTERS OF MULTIPLE WIDTHS

FIELD OF THE INVENTION

The present invention relates to computer architectures, and more particularly to processor mode compatibility.

BACKGROUND

Early implementations of superscalar computer architectures used 32-bit based hardware and logic. As time progressed, wider word lengths, including 64-bit based architectures began to emerge. Because many early systems used 32-bit based hardware and logic, much of the existing code base was configured for use on 32-bit based hardware. When using 64-bit architectures, it may be desirable to use pre-existing 32-bit based code while still being able to handle 64-bit operations.

There is thus a need for addressing these and/or other issues associated with the prior art.

SUMMARY

A system, method, and computer program product are provided for performing a register renaming operation utilizing hardware which operates in at least two modes. In operation, hardware is operated in at least two modes including a first mode for operating the hardware using a logical register of a first bit width and a second mode for operating the hardware using a logical register of a second bit width. The first bit width is twice a width of the second bit width. Additionally, a register renaming operation is performed, including renaming at least one logical register to at least one physical register of the first bit width, utilizing the hardware.

DETAILED DESCRIPTION

Figure 1:
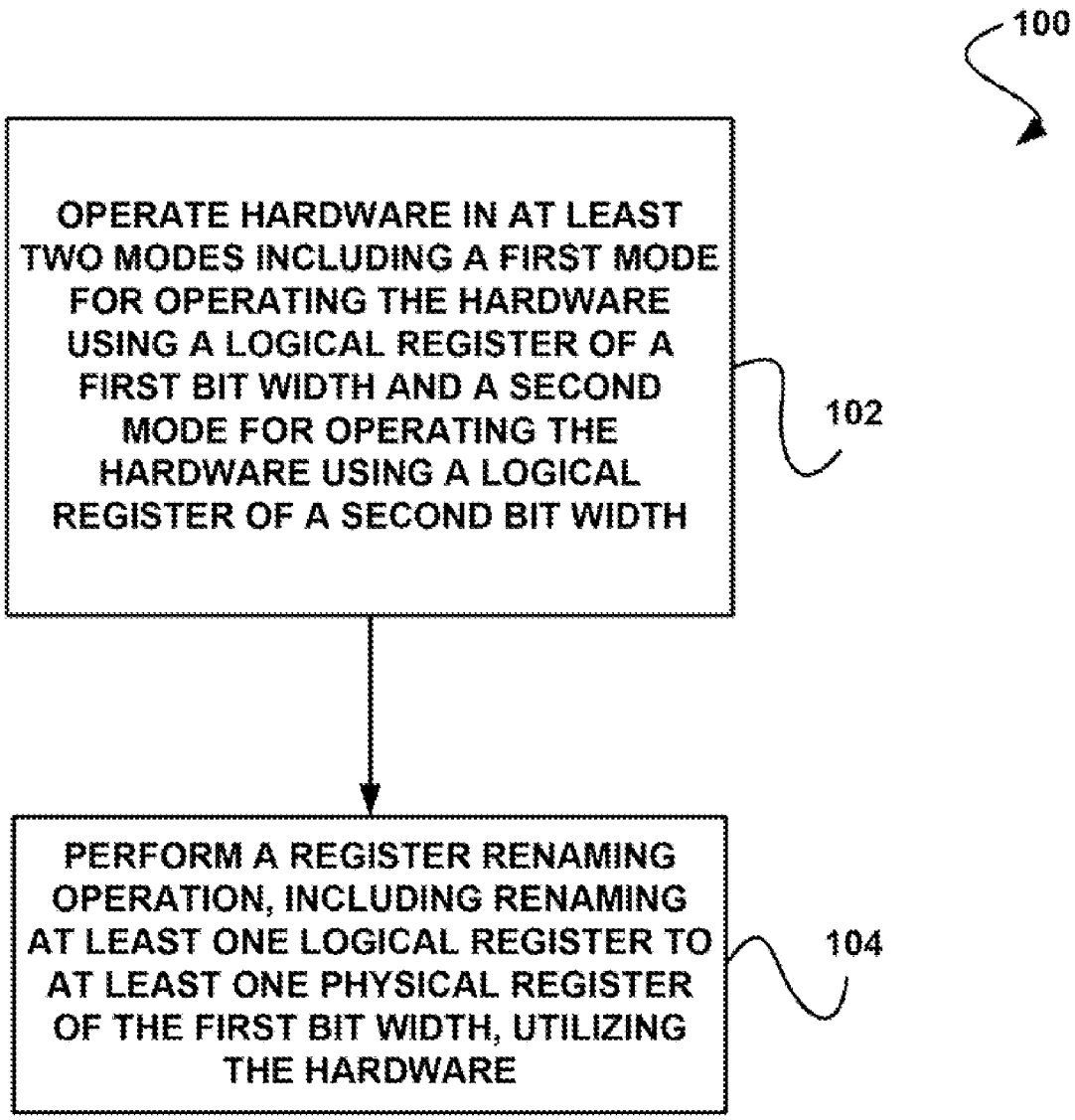
FIG. 1 shows a method for performing a register renaming operation utilizing hardware which operates in at least two modes, in accordance with one embodiment.

FIG. 1 shows a method 100 for performing a register renaming operation utilizing hardware which operates in at least two modes, in accordance with one embodiment. As shown, hardware is operated in at least two modes including a first mode for operating the hardware using a logical register of a first bit width and a second mode for operating the hardware using a logical register of a second bit width. The first bit width is twice a width of the second bit width. See operation 102.

In the context of the present description, hardware refers to hardware corresponding to a processor. For example, in various embodiments, hardware may include, but is not limited to, hardware corresponding to a central processor, a graphics processor, a microprocessor, a digital signal processor, and/or any other hardware that meets the above definition. In one embodiment, the hardware may include hardware corresponding to a reduced instruction set computer (RISC) microprocessor.

Strictly as an option, the hardware may include a MIPS architecture. As another option, the hardware may include a processor to implement an instruction set architecture including any MIPS, or non-MIPS architecture. In the context of the present description, an instruction set architecture is a part of a computer architecture relating to programming. In various embodiments, the instruction set architecture may include a programming model, native data types, instructions, registers, addressing modes, memory architecture, interrupt and exception handling, external I/O, and various other functionality and architecture.

In one embodiment, the instruction set architecture may include a specification of a set of opcodes (e.g. machine language), which are the native commands implemented by a particular processor design. As yet another option, the hardware may include an out-of-order instruction execution architecture. In the context of the present description, an out-of-order architecture refers to any architecture that supports out-of order execution or processing. This includes, but is not limited to superscalar architectures. In one embodiment, such architecture may allow the hardware to avoid stalls which may occur when data to perform an operation is not available.

Furthermore, in one embodiment, the first bit width and the second bit width may include a 64 bit width and a 32 bit width, respectively. As an option, operating may include utilizing a data type of the first bit width. For example, the operating may include utilizing a data type of 64 bits. In another embodiment, the operating may include utilizing a data type of the second bit width. For example, the operating may include utilizing a data type of 32 bits.

As an option, the first bit width and the second bit width may correspond to a first precision and a second precision for operating the hardware. In one embodiment, the first precision and second precision may include a double precision and a single precision, respectively. For example, the first precision may include a 64-bit precision. Further, the second precision may include a 32-bit precision.

In the context of the present description, a 32-bit quantity may be viewed as a single precision quantity, and a 64-bit quantity may be viewed as a double precision quantity. As an option, the first and/or second precision may be determined by an indicator. For example, upon decoding a received indicator, a first mode or a second mode of operation for the hardware may be determined.

In one embodiment, an instruction or operation may include the indicator. As an option, the first mode or second mode may be indicated by a value of a mode bit. Additionally, in the case of a plurality of threads, at least one mode bit may be included for each thread.

As shown further, a register renaming operation is performed, including renaming at least one logical register to at least one physical register of the first bit width, utilizing the hardware. See operation 104. In one embodiment, the register renaming may depend on the operating mode of the hardware. In one embodiment, the physical register may include a double-precision register in a floating point unit register file (FPR).

In another embodiment, the physical register may include one or more 32 b registers in a floating point unit register file. In the case where the logical 64 b register is mapped to two physical 32 b registers (and since a generalized design supports both modes), it would mean that, when working on double precision data types, each logical double precision register would have to be mapped to two physical single precision registers. Thus, an instruction with 4 operands (e.g. 3 source, 1 destination) would need 3×2 read ports and 1×2 write ports into the FPR. A register renamer may map the 3 logic sources into 6 physical registers and allocate two physical registers for the result.

In the case where the physical register is mapped to a single-precision register in a floating point unit register file, an exemplary technique is provided to keep the organization of the floating point unit the same in both modes. In this case, the physical FPR is organized as 32×64 bits wide, and 64 bit data types are stored in a single entry.

Using this mapping technique, the renamer may map to 3 physical registers and allocate a single physical register for the destination. Also, the FPR now only needs 4 read ports and a single write port. The 3 read ports are for the 3 source operands and the fourth read port is to read the previous value of the destination.

In one embodiment, a 64-bit data-type is divided into adjacent 32-bit logical register entries. In another embodiment, the logical register may be configured such that 32 bits of the 64-bit register is used. In this case, the plurality of logical registers may be configured such that adjacent logical registers store either a lower or an upper portion of a 64-bit data. Stated more generally, a double precision quantity may be implemented using two adjacent single precision registers. In this case, a double precision operation may read or write to adjacent single precision registers.

Still yet, in one embodiment, the renaming operation may include zeroing out, or masking a least significant bit (LSB) of an address of a lower-order of the adjacent single-precision register in order to create a single double precision register at that same address. For example, a first of two adjacent single precision registers may store 32-bit data. In this case, the renaming operation may include zeroing out or masking the address bit corresponding to the second (higher address) of the adjacent logical registers, thus creating a single double-precision register. Of course, the preceding optional embodiments are set forth as exemplary features only and should not be construed as limiting in any manner.

It should be noted that, the present embodiment is not limited to utilizing the LSB. For example, any bit position of the logical register address may used. Although the same bit position may have to be used in all operations. For example, the logical register may include a first register and a second register that belongs to a same logical register set. In this case, any bit position may be used. In one embodiment, a least significant bit of an address of the logical register and an address of the physical register may not be masked during the first mode of operation.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
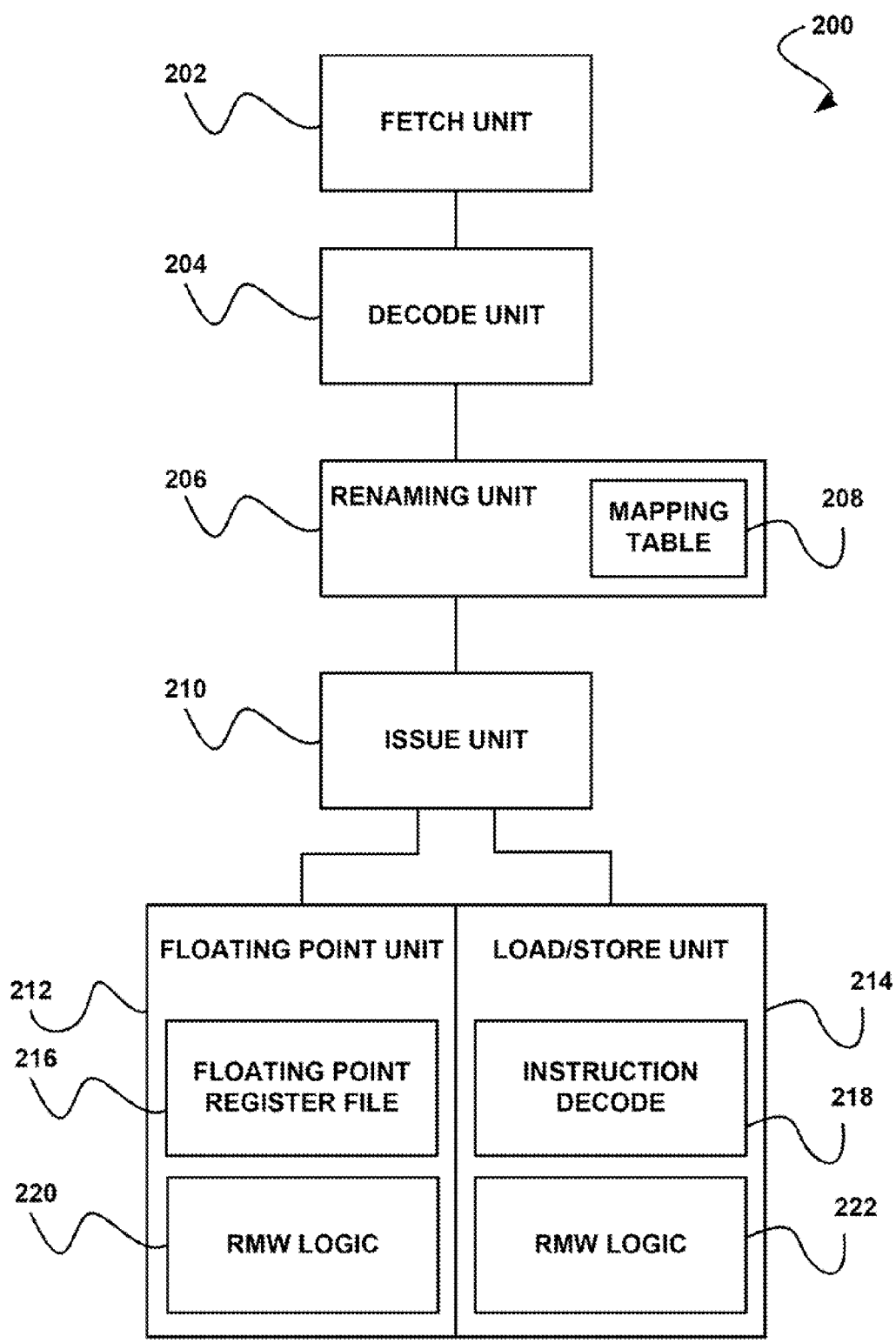
FIG. 2 shows a system for performing a register renaming operation utilizing hardware which operates in at least two modes, in accordance with one embodiment.

FIG. 2 shows a system 200 for performing a register renaming operation utilizing hardware which operates in at least two modes, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, a fetch unit 202 is provided. In operation, the fetch unit 202 may be used to fetch or retrieve instructions. In one embodiment, the instructions may include a mode indicator. Of course, the mode indicator is not limited to being included in the instructions.

In various other embodiments, the mode indicator may be provided using various other methods. As an option, the mode indicator may indicate a mode of operation for the system 200. Additionally, the mode indicator may correspond to a precision of operation.

In one embodiment, the mode indicator may indicate a first mode for operating the system 200 with a first precision. Furthermore, the mode indicator may indicate a second mode for operating the system 200 with a second precision. For example, a mode indicator with a binary value of "1" may correspond to double precision, whereas a mode indicator with a binary value of "0" may correspond to single precision. As an option, the first and second precisions may include a 64-bit precision and a 32-bit precision respectively.

Additionally, in one embodiment, a first thread may be capable of executing in the first mode operation simultaneously with a second thread executing in the second mode of operation. For example, the first thread may operate in a 64-bit precision mode, while the second thread is simultaneously operating in a 32-bit precision mode. In another embodiment, a plurality of threads may be capable of operating in the same or different modes.

Additionally, a decode unit 204 is provided. The decode unit 204 may be used to decode the instructions retrieved by the fetch unit 202. In one embodiment, the decode unit 204 may be used to determine whether the instructions include a mode indicator. As an option, the decode unit 204 may be used to determine a mode which is indicated by the mode indicator.

As shown further, a renaming unit 206 is provided. In operation, the renaming unit 206 may be used to perform a register renaming operation. For example, the renaming unit 206 may be used to map a logical register to at least one physical register.

Included in the renaming unit 206 is a mapping table 208. The mapping table 208 may include information to map a plurality of logical registers to a plurality of physical registers. For example, the mapping table 208 may be used to determine which logical register maps to which physical register or plurality of registers.

As shown further, an issue unit 210 is provided. In operation, the issue unit 210 may be used to delegate or route instructions to a floating point unit 212, or a load/store unit 218, or any other instruction processing unit, storing unit, or instruction processing pipeline. For example, if the instruction is a floating point instruction, the issue unit 210 may route the instruction to the floating point unit 212. On the other hand, if the instruction is a load/store instruction, the issue unit 210 may route the instruction to the load/store unit 214. One skilled in the art can now appreciate that the mapping technique discussed supra in combination with superscalar architectures provides compatibility for the aforementioned double precision, and single precision instructions without necessarily requiring re-architecture of all of the instruction pipelines.

Included with the floating point unit 212, is a floating point register file 216. The floating point register file 216 is a physical register file which may be used to store floating point data. For example, the mapping table 208 may include information which maps a logical register to a register in the floating point register file 216. Additionally, as an option, the floating point unit 212 may include read-modify-write (RMW) logic 220.

The load/store unit 214 may also include a physical register file. For example, the mapping table 208 may include information which maps a logical register to a physical register in the load/store unit 214. In such case, the issue unit 210 may route the load/store instruction to the physical register in the load/store unit 214 based on the information included in the mapping table 208.

Additionally, the load store unit 214 may include an instruction decode module 218. Such instruction decode module 218 may be utilized to decode instructions received by the issue unit 210. As an option, the system 200 may support unaligned memory accesses. As shown, the load/store unit 214 may include hardware to operate read-modify-write logic 222.

The hardware to operate read-modify-write logic 222 may include load/store instructions used to load and store single precision and/or double precision data to and from other locations. For example, the load/store instructions may operate to utilizing load data left (LDL) logic, load data right (LDR) logic, store data left (SDL) logic, and store data right (SDR) logic, or various unaligned register or memory access commands. Of course, the read-modify-write logic 222 is not limited to unaligned register or memory access commands and may include any type of read-modify-write logic.

Figure 3A:
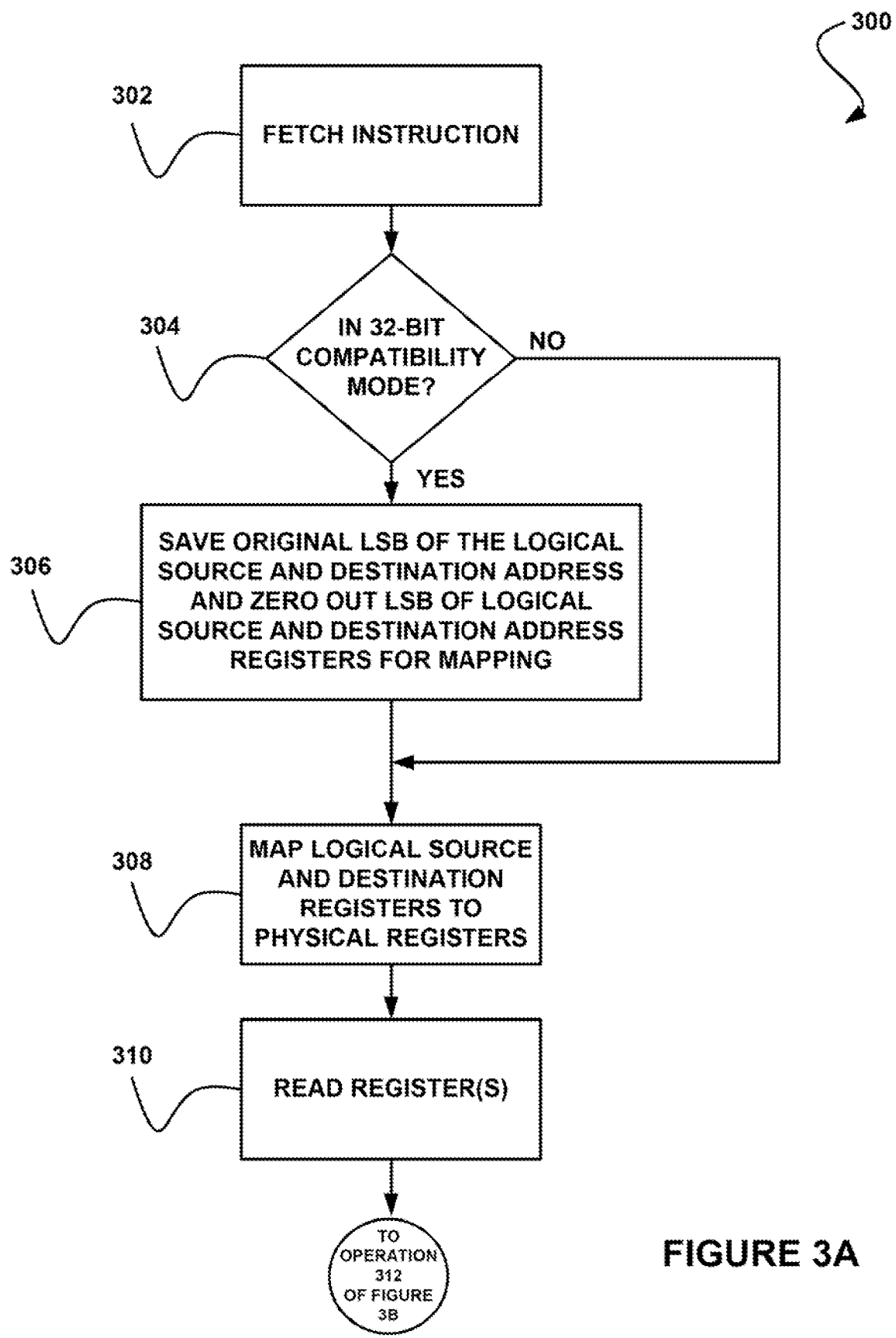
FIGS. 3A and 3B show a method for performing a register renaming operation utilizing hardware which operates in at least two modes, in accordance with another embodiment.

FIGS. 3A and 38 show a method 300 for performing a register renaming operation utilizing hardware which operates in at least two modes, in accordance with another embodiment. As an option, the present method 300 may be implemented in the context of the functionality and architecture of FIGS. 1-2. Of course, however, the method 300 may be carried out in any desired environment. It should also be noted that the aforementioned definitions may apply during the present description.

As shown, an instruction is fetched or retrieved. See operation 302. Once the instruction is retrieved, it is determined whether the instruction indicates operation in a compatibility mode. See operation 304.

In the context of the present description, 32-bit compatibility mode refers to a 32-bit mode of operation on a system in which the primary mode is something other than the 32-bit mode. For example, the system may be based on a 64-bit architecture. In this case, the 32-bit compatibility mode would refer to a mode where the system allows for 64-bit operation, as well as 32-bit operation (i.e. 32-bit data compatible).

In one embodiment, the 32-bit compatibility mode may be indicated by a specific bit. For example, a bit with a value of logic "0" may indicate the 32-bit compatibility mode. Continuing with this example, a bit with a value of logic "1" may indicate a 64-bit mode. Of course, the 32-bit compatibility mode may be indicated using various techniques and is not limited to using a bit as an indicator.

If it is determined that the instruction indicates operation in the 32-bit compatibility mode, an original LSB of the address of a logical source and destination register is saved. Furthermore, the LSB of the logical source and destination register addresses are zeroed out for mapping to a physical register. See operation 306.

The logical source and destination registers are then mapped to the physical registers. See operation 308. In the context of the present description, the term logical source registers refer to logical registers that include the input operands of the instruction and the term logical destination registers refer to logical registers that include a location for a result of the instruction (e.g. a computation).

The logical source and destination registers are mapped to the physical registers, as shown in operation 308. Once the logical source and destination registers have been mapped, the logical source and destination registers are read. See operation 310.

After the logical source and destination registers are read, it is determined whether the instruction includes a memory operation. See operation 312. If it is determined that the instruction does not include a memory operation, the instruction is executed. See operation 314.

Once the instruction is executed, it is determined whether the instruction includes a 32-bit operation in the 32-bit compatibility mode. See operation 316. If the instruction includes a 32-bit operation in the 32-bit compatibility mode, it is determined whether the saved LSB of the logical destination register address is equal to zero. See operation 318.

If it is determined that the saved LSB of the logical destination register address is equal to zero, a result of the instruction is merged with an upper 32-bit content (i.e. data) of a previous physical register mapping of the logical destination register. See operation 320. If it is determined that the LSB of the logical destination register is not equal to zero, the result of the instruction is merged with a lower 32-bit content of a previous physical register mapping of the logical destination register. See Operation 322.

Once the result is merged, the register is written. See operation 324. Similarly, if it is determined in operation 316 that the instruction does not include a 32-bit operation in the 32-bit compatibility mode, the register is written.

If it is determined in operation 312 that the instruction includes a memory operation, it is then determined whether the instruction includes a load operation. See operation 326. If the instruction includes a load operation, data is read from memory. See operation 328.

Once the memory is read, it is determined whether the instruction includes a 32-bit operation in the 32-bit compatibility mode. See operation 330. If the instruction includes a 32-bit operator and indicates operation in the 32-bit compatibility mode, it is determined whether the saved LSB of the logical destination register address is equal to zero. See operation 332.

If it is determined that the LSB of the logical destination register address is equal to zero, then existing RMW logic is used and the data to be loaded is merged with a lower 32-bit content of a previous physical register mapping of the logical destination register. See operation 336. If it is determined that the LSB of the logical destination register address is not equal to zero, existing RMW logic is used and the data to be loaded is merged with an upper 32-bit content of a previous physical register mapping of the logical destination register. See operation 334.

Once the load data is merged, the register is written. See operation 324. Similarly, if it is determined in operation 330 that the instruction does not include a 32-bit operator and the instruction did not indicate operation in the 32-bit compatibility mode, the register is written.

If it is determined in operation 326 that the instruction does not include a load operation, it is determined whether the instruction includes a 32-bit operation in the 32-bit compatibility mode. See operation 338. If the instruction includes a 32-bit operation in the 32-bit compatibility mode, it is determined whether the saved LSB of the logical destination register address is equal to zero. See operation 340.

If it is determined that the LSB of the logical destination register is equal to zero, existing RMW logic is used to store a lower 32 bits of data. See operation 342. If it is determined that the LSB of the logical destination register address is not equal to zero, existing RMW logic is used to store an upper 32 bits of data. See operation 344.

Further, the data is written to memory. See operation 346. Similarly, if it is determined in operation 338 that the instruction does not include a 32-bit operator and that the instruction did not indicate operation in the 32-bit compatibility mode, the data is written to memory.

Figure 3B:
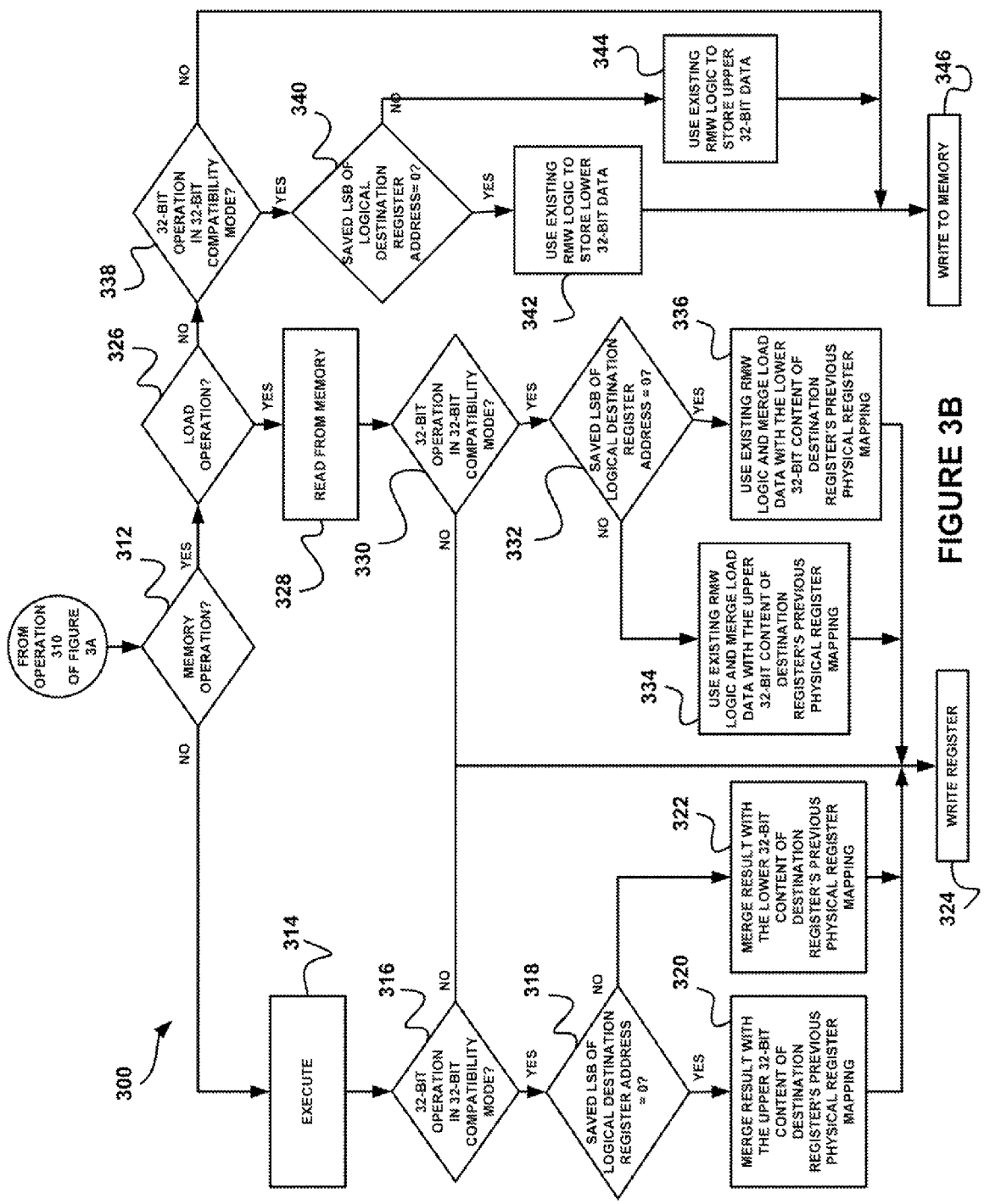
Figure 4:
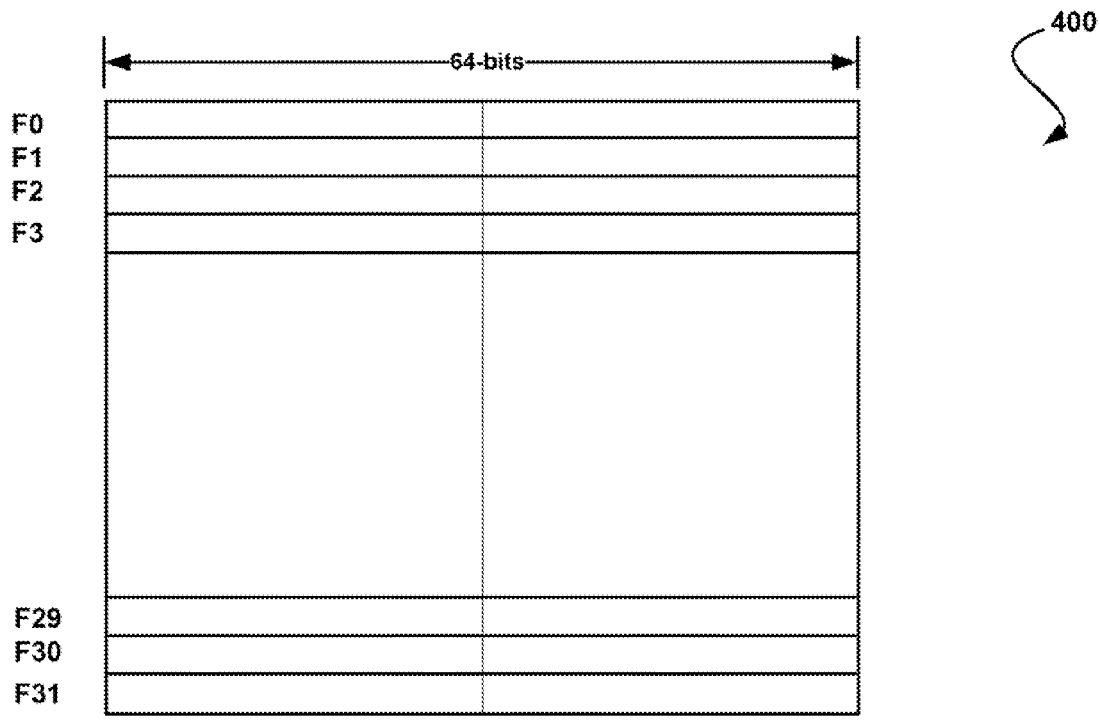
FIG. 4 shows a configuration of a logical register file for performing a register renaming operation utilizing hardware which operates in at least two modes, in accordance with one embodiment.

FIG. 4 shows a configuration of a logical register file 400 for performing a register renaming operation utilizing hardware which operates in at least two modes, in accordance with one embodiment. As an option, the configuration of the logical register file 400 may be implemented in the context of the functionality and architecture of FIGS. 1-3. Of course, however, the configuration of the logical register file 400 may be implemented in any desired environment. It should also be noted that the aforementioned definitions may apply during the present description.

As shown, a logical register file 400 is configured as a 64-bit, 32-entry logical register file. In one embodiment, the logical register file 400 may represent a logical register corresponding to a specific mode. For example, the logical register file 400 may represent a configuration corresponding to a mode for operating hardware with a first precision of 64-bits. In this mode, each register (e.g. $F_0$, $F_1$, $F_2$, etc.) may be addressed individually as a 64-bit entry.

In one embodiment, each of the 32 logic registers may be addressed by specific instructions defined in an instruction set architecture (ISA). For instance, the instruction may specify a function or an operation over three logical source registers (e.g. $F_x$, $F_y$, and $F_z$) which writes the result of the operation to a logical destination register, $F_d$. In the context of the present description, x, y, z, and d are integers corresponding to different logical register entries.

In this example, the expression $F_d = f(F_x, F_y, F_z)$ represents the logical destination $F_d$ register as a function of the logical source registers $F_x$, $F_y$, and $F_z$. In the context of register renaming, the logical source registers $F_x$, $F_y$, and $F_z$ may be mapped to physical registers $P_a$, $P_b$, and $P_c$, while the destination logical register may be mapped to the physical register $P_d$. In this case, $P_a$, $P_b$, $P_c$, and $P_d$ represent different 64-bit physical registers.

Figure 5:
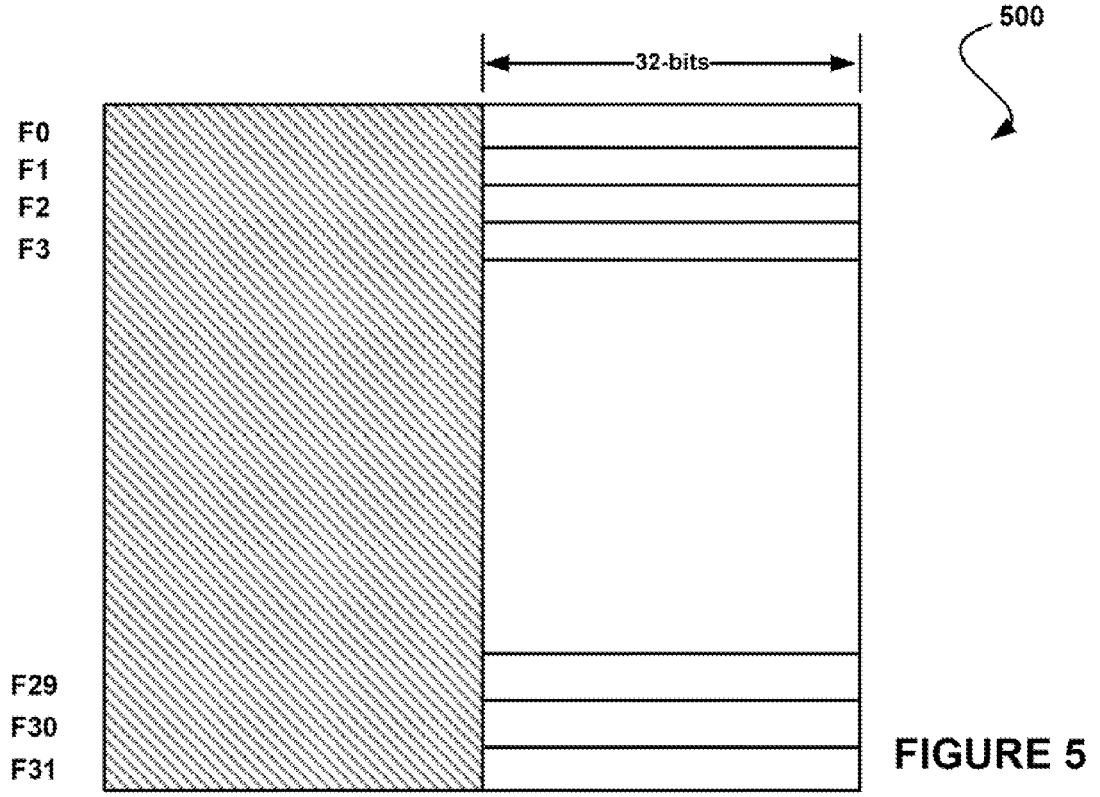
FIG. 5 shows a configuration of a logical register file for performing a register renaming operation utilizing hardware which operates in at least two modes, in accordance with another embodiment.

FIG. 5 shows a configuration of a logical register file 500 for performing a register renaming operation utilizing hardware which operates in at least two modes, in accordance with another embodiment. As an option, the configuration of the logical register file 500 may be implemented in the context of the functionality and architecture of FIGS. 1-4. Of course, however, the configuration of the logical register file 500 may be implemented in any desired environment. It should also be noted that the aforementioned definitions may apply during the present description.

As shown, the logical register file 500 is a 64-bit logical register file configured as a 32-bit entity with a plurality of logical register file entries (e.g. $F_0$, $F_1$, $F_2$, etc.). As configured, a 64-bit operation may be performed over even-odd pairs of registers (e.g. $F_0$ and $F_1$). As an option, the configuration of the logical register file 500 may be a configuration resulting from a 32-bit compatibility mode.

As shown, the adjacent logical register entries are even-odd logical register pairs, which straddle contiguous logical register entries (e.g. $F_{30}$ and $F_{31}$). Thus, 64-bit data may be stored using even-odd pairs of registers. For instance, writing a 64-bit result to $F_{30}$ may involve writing a lower 32 bits of data to $F_{30}$ and an upper 32 bits of data to $F_{31}$.

Furthermore, in this configuration, any 64-bit computation may read the adjacent even-odd pairs in addition to writing to the adjacent even-odd pairs, as specified by an instruction. Using this configuration, the logical register file 500 may also store single-precision floating-point data. For example, 32-bit data may be stored or written to $F_0$ or $F_1$.

In the context of register renaming, if a 64-bit operation is performed using the configuration of the logical register 500, three source registers pairs may utilize six physical registers. For example, the logical pairs $F_{x-even}$, $F_{x-odd}$; $F_{y-even}$, $F_{y-odd}$; and $F_{z-even}$, $F_{z-odd}$ may correspond to six physical registers (e.g. $P_0$-$P_5$). Additionally, the result of any operation involving the logical pairs may be written to a discrete mapping odd and even physical register (e.g. $P_7$ and $P_8$) corresponding to a logical destination register (e.g. $F_{d-even}$, $F_{d-odd}$). Therefore, a total of 6 read ports and 2 write ports may be utilized for this example.

Figure 6:
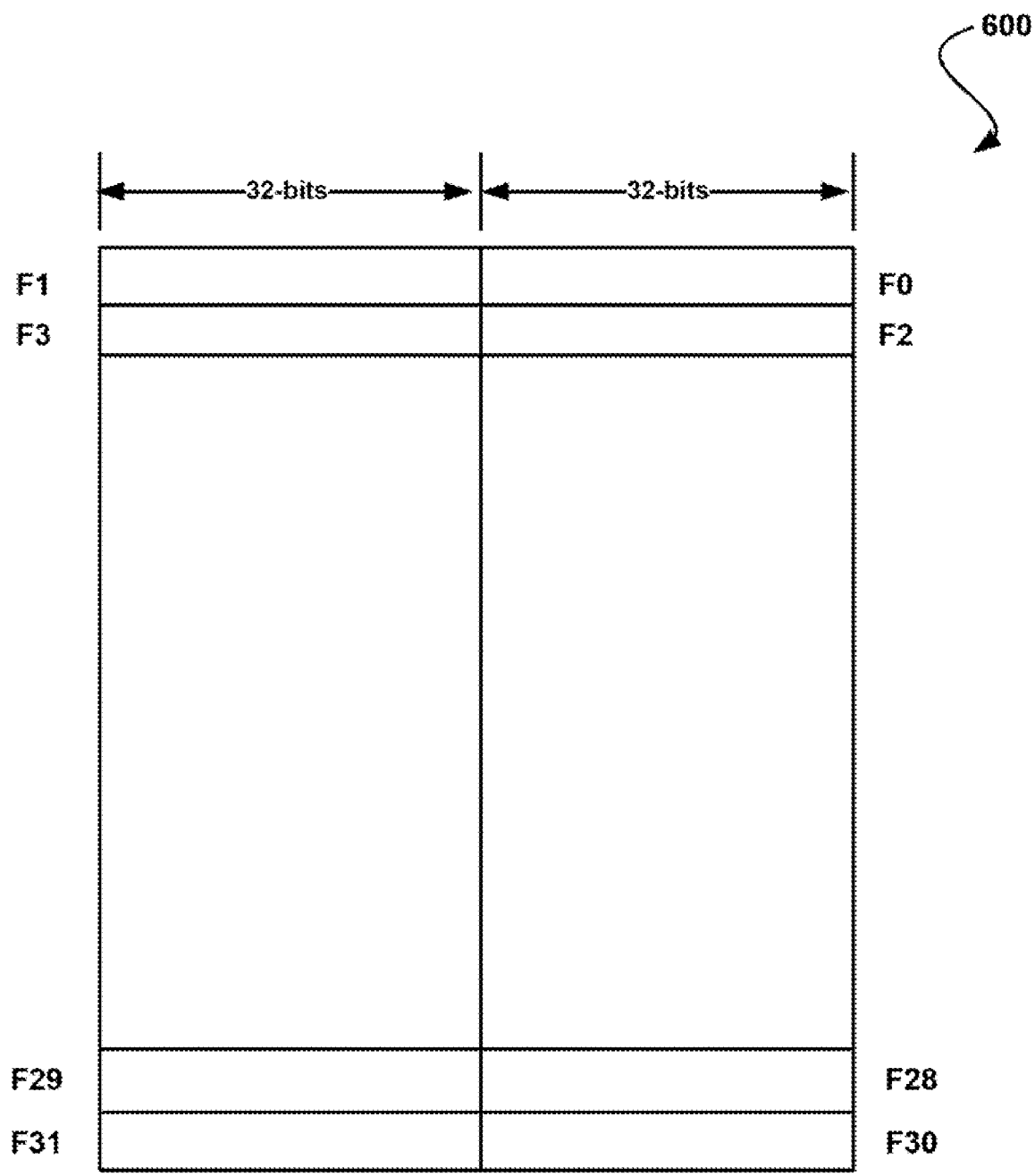
FIG. 6 shows a configuration of a logical register file for performing a register renaming operation utilizing hardware which operates in at least two modes, in accordance with another embodiment.

FIG. 6 shows a configuration of a logical register file 600 for performing a register renaming operation utilizing hardware which operates in at least two modes, in accordance with another embodiment. As an option, the configuration of the logical register file 600 may be implemented in the context of the functionality and architecture of FIGS. 1-5. Of course, however, the configuration of the logical register file 600 may be implemented in any desired environment. It should also be noted that the aforementioned definitions may apply during the present description.

As shown, the logical register file 600 is a 64-bit logical register file configured to include two adjacent 32-bit logical registers. As configured, the logical register file 600 includes a first and a second 32-bit adjacent register (e.g. $F_0$ and $F_1$). In one embodiment, a first portion of 64-bit data may be stored in the first 32-bit adjacent register and a second portion of the 64-bit data may be stored in the second 32-bit adjacent register.

Additionally, in one embodiment, 32-bit data may be stored in one of the first or second 32-bit adjacent registers. As an option, an LSB of the address of the first or second 32-bit adjacent registers may be masked during the second mode of operation. Furthermore, any 64-bit operation may be performed over even-odd pairs of registers (e.g. $F_0$ and $F_1$).

The logical register file 600 is configured such that the logical register file 600 supports data types of double-precision and long-integer, as well as 32-bit or single-precision floating-point data. As an option, the configuration of the logical register file 600 may be a configuration resulting from a 32-bit compatibility mode.

In one embodiment, hardware may be capable of executing N operations simultaneously, where N is an integer. In this case, a number of read ports required to obtain a logical-to-physical mapping may be less than or equal to 6N. In one embodiment, a number of write ports required to obtain a logical-to-physical mapping may be less than or equal to 2N.

In another embodiment, the number of read and write ports may be reduced by regimentally storing the 64-bit data in even-odd logical register pairs. By regimentally storing the 64-bit data in even-odd logical register pairs, one read port may be used for each of even-odd logical pair. For example, if $\{F_{x-even}, F_{x-odd}\}$, $\{F_{y-even}, F_{y-odd}\}$ and $\{F_{z-even}, F_{z-odd}\}$ indicate three logical register pairs, $P_a$, $P_b$, and $P_c$ may represent three physical registers corresponding to the three logical register pairs.

In one embodiment, register renaming and logical to physical mapping in the 32-bit compatibility mode may be performed by masking (i.e., zeroing out) the LSB of the address of the logical register. For example, in the case of a 32-bit result or data, the logical register pair $F_{x-even}$ and $F_{x-odd}$ may map to the same physical register, $P_a$, with the $F_{x-even}$ register mapped to an upper 32-bit portion of $P_a$ and the $F_{x-odd}$ register mapped to a lower 32-bit portion of $P_a$. In this case, the LSB of the address of logical registers $F_{x-even}$ or $F_{x-odd}$ may be zeroed out. Similarly, the destination register, $F_d$, may be mapped by masking the LSB.

In one embodiment, a 32-bit portion (e.g. the upper or lower portion) of the physical register data may be preserved by copying that portion from a previous register mapping (e.g. $P_k$). It should be noted that this may call for a port read. For instance, if a 32-bit result is written to the lower 32-bit portion of a 64-bit register space $P_m$, the lower 32-bit may be written using from the previous mapping (e.g. $P_k$) of the logical register $F_d$.

In the case that unaligned memory accesses are supported, unaligned load/store left (or right) may be used to implement the read-modify-write logic to load a portion of the data from memory to the upper (or lower) portion of the register, and preserve the lower (or upper) portion of the register. These unaligned load/store instructions may read 64 bit data from the register file and merge either the upper or lower portion of the register data with data from memory. In the above example, and considering a three source operand instruction, plus destination, renaming the three logical register pairs may utilize 4 read ports and 1 write port; three read ports for each of the three source operands, one read for any read-modify-write of the destination as may be utilized during computation, and one write for storing the result of the computation to the destination.

As an additional example in formal notation, in embodiments, where the hardware is capable of evaluating N operands simultaneously, the number of read and write ports utilized in the register file may be 4N and N. respectively. That is, the operation $F_d = f(F_x, F_y, F_z)$ may map to the rename space as $P_m = f(P_a, P_b, P_c, P_k)$, where $F_x, F_y, F_z$ each represent logical even-odd pairs of logical registers, $F_d$ represents the destination logical register, and $P_a$, $P_b$, $P_c$, $P_k$ represent physical registers. In this case, $P_m$ represents the physical register corresponding to the result. Thus, for N=1, the register file may be implemented with 4N=4 read ports, and N=1 write ports; one read port for each of operands $P_a$, $P_b$, $P_c$, one read port for any read-modify-write of the value of the former destination $P_k$ as may be required during computation, and one write for storing the result of the computation to the final destination $P_m$.

It should be noted, that memory operations in a 32-bit compatibility mode may be treated similarly, with respect to renaming. For example, if hardware supports unaligned memory accesses (e.g. unaligned load/store left or unaligned load/store right, etc.) which load a part of the data from memory to an upper or lower portion of register, preserving the lower or upper portion of the register, the same hardware may be reused to implement the 32-bit operations. These instructions may read 64-bit data from the register file and merge either the upper or lower portion of the register data with data from memory. In one embodiment, regular loads and stores may be treated as unaligned loads and stores in 32-bit compatibility mode, thereby providing backward mode compatibility for unaligned loads and stores using hardware architected for the former mode.

Thus, if the hardware supports a read-modify-write mechanism to merge register data with data from memory, the read-modify-write mechanism may merge a first or second register with data from memory based on the LSB or the other bit position used.

Figure 7:
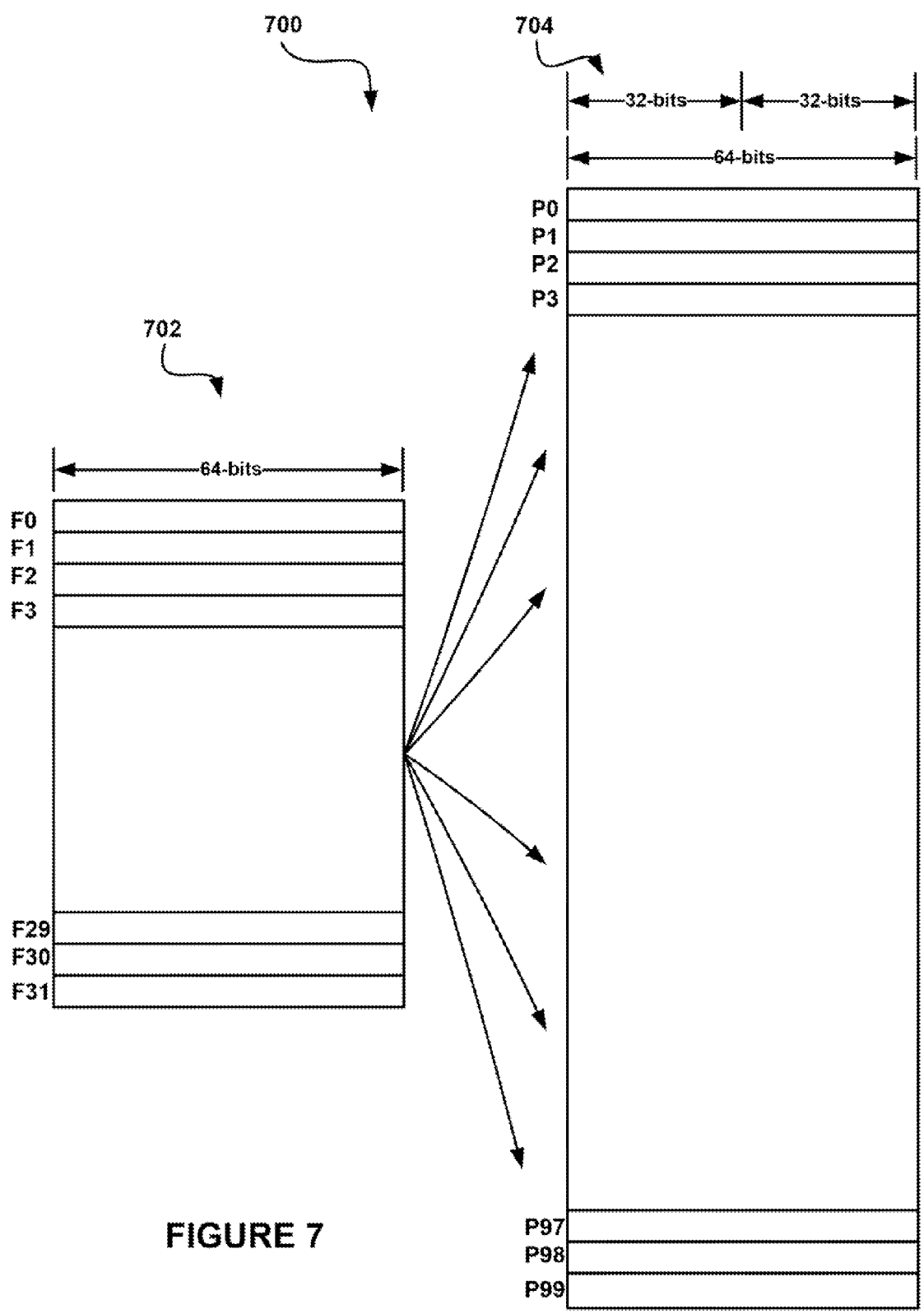
FIG. 7 shows a system for performing a register renaming operation utilizing hardware which operates in at least two modes, in accordance with another embodiment.

FIG. 7 shows a system 700 for performing a register renaming operation utilizing hardware which operates in at least two modes, in accordance with another embodiment. As an option, the system 700 may be implemented in the context of the functionality and architecture of FIGS. 1-6. Of course, however, the system 700 may be implemented in any desired environment. It should also be noted that the aforementioned definitions may apply during the present description.

As shown, a logical register file 702 is configured as a 64-bit, 32-entry logical register file. In one embodiment, the logical register file 702 may represent a logical register corresponding to a specific mode. For example, the logical register file 702 may represent a configuration corresponding to a mode for operating hardware with a first precision of 64-bits. In this mode, each register (e.g. $F_0$, $F_1$, $F_2$, etc.) may be addressed individually as a 64-bit entry.

In various other embodiments, the logical register file 702 may represent a logical register corresponding to a 32-bit compatibility mode. For example, in various embodiments, the logical register file 702 may be configured as the logical registers shown in FIG. 5 and FIG. 6. In such case, the logical register file 702 may be configured as adjacent even-odd 32-bit logical register pairs.

As shown further, a 64-physical register file 704 is provided. Each register entry in the physical register file 704 is 64 bits. In operation, the logical register entries of the logical register file 702 are mapped to physical register entries in the physical register file 704.

For example, $F_0$ and $F_1$ of the logical register file 702 may map to $P_3$ and $P_4$ of the physical register file 704. In 32-bit compatibility mode, if 32-bit data was written to $F_0$ or $F_1$, the register renaming and logical to physical mapping mode may involve masking (i.e., zeroing out) the LSB of the address of logical register $F_0$ and $F_1$. In this case, the upper or lower portion of the physical register data may be preserved by copying that portion from a previous register mapping (e.g. $P_1$).

Figure 8:
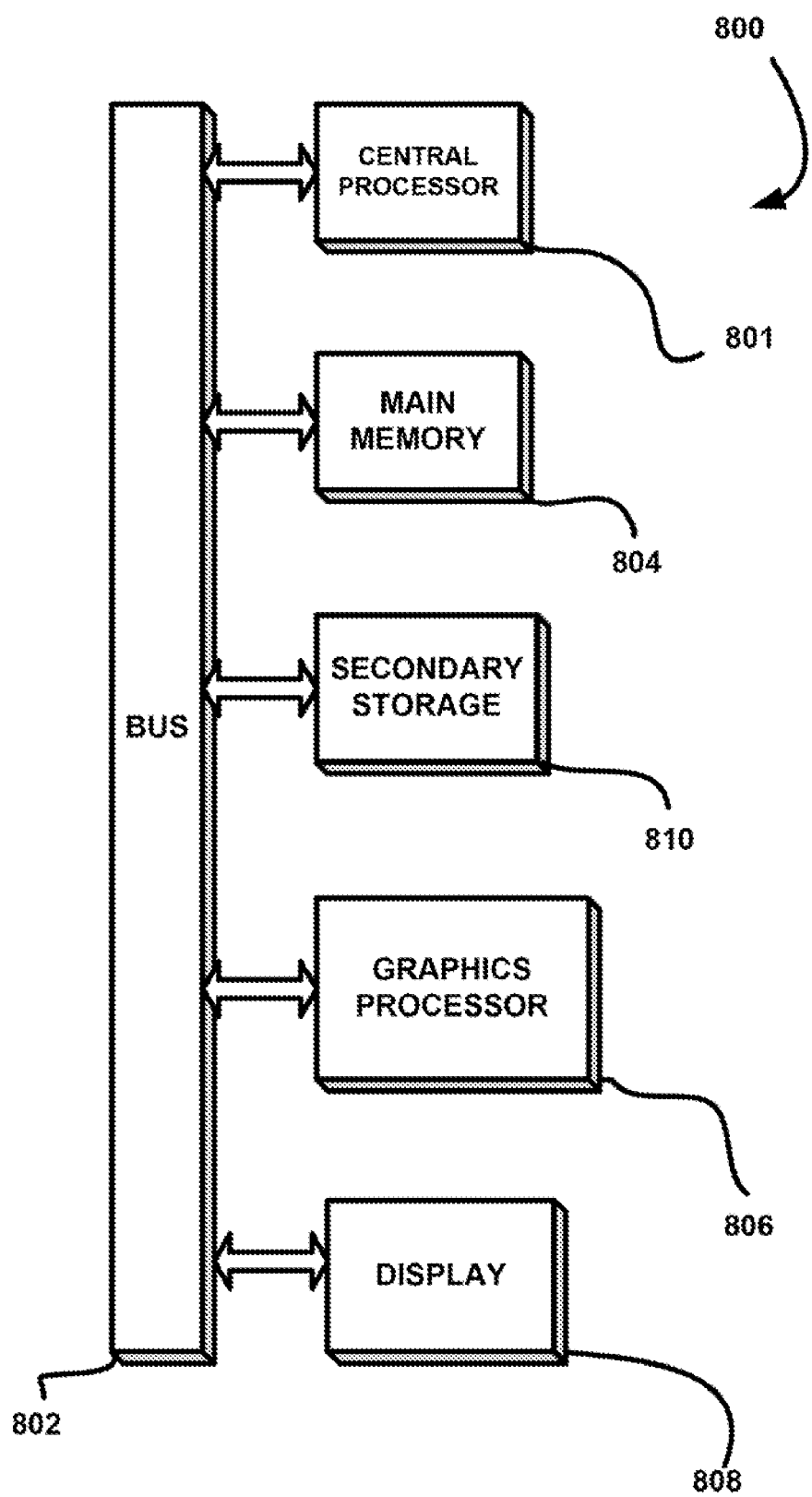
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 may optionally include a graphics processor 806 and a display 808, i.e. a computer monitor. The system 800 may also include as secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, an application-specific system, and/or any other desired system. For example, the system 800 may take the form of a desktop computer, lap-top computer, and/or any other type of logic. Still yet, the system 800 may take the form of various other devices including, but not limited to a personal digital assistant (PDA) device, a mobile phone device, a television, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   operating hardware corresponding to a processor in at least two modes including a first mode for operating the hardware using a logical register of a first bit width and a second mode for operating the hardware using a logical register of a second bit width, wherein the processor operates on instructions based at least in part upon a mode indicator such that the instructions are operated on at a first precision when in the first mode and the same instructions are operated on at a second precision when in the second mode, and when executing a plurality of threads, a first thread operates in the first mode with the first precision based at least in part upon the mode indictor included for the first thread and a second thread operates in the second mode with the second precision based at least in part upon the mode indicator included for the second thread; and
   performing a register renaming operation based at least in part upon the mode indicator, wherein the register renaming operation depends on the operating mode of the hardware and the act of performing comprises renaming at least one logical register to at least one physical register of the first bit width when in the first mode for operating the hardware.

2. The method of claim 1, wherein the operating includes utilizing a data type of the second bit width.

3. The method of claim 1, wherein the operating includes utilizing a data type of the first bit width.

4. The method of claim 1, wherein the hardware includes an instruction set architecture.

5. The method of claim 1, wherein the hardware includes an out-of-order architecture.

6. The method of claim 1, wherein the at least one logical register is of the second bit width.

7. The method of claim 1, wherein the at least one logical register is of the first bit width.

8. The method of claim 7, wherein a least significant bit of an address of the at least one logical register is not masked during the first mode of operation.

9. The method of claim 1, wherein the at least one logical register includes a first register and a second register that belong to a same set.

10. The method of claim 1, wherein the at least one logical register includes a first register and a second register adjacent to the first register.

11. The method of claim 10, wherein a first portion of data of a size equal to the first bit width is stored in the first register and a second portion of the data is stored in the second register.

12. The method of claim 10, wherein data of a size equal to the second bit width is stored in one of the first register or the second register.

13. The method of claim 12, wherein a least significant bit of an address of the first register or address of the second register is masked during the second mode of operation.

14. The method of claim 12, wherein the renaming includes masking a bit position.

15. The method of claim 14, wherein the hardware supports a read-modify-write mechanism to merge logical register data with data from memory.

16. The method of claim 15, wherein the read-modify-write mechanism merges data from one of the first register or the second register with data from the memory based on the masked bit position.

17. The method of claim 1, wherein the hardware is capable of executing simultaneously N operations, and a number of write ports required to obtain a logical-to-physical mapping is less than or equal to 2N.

18. The method of claim 17, wherein the number of write ports is N.

19. The method of claim 1, wherein the hardware is capable of executing simultaneously N operations, and a number of read ports required to obtain a logical-to-physical mapping is less than or equal to 6N.

20. The method of claim 19, wherein the number of read ports is 4N.

21. The method of claim 1, wherein the first thread is capable of executing in the first mode of operation simultaneously with the second thread executing in the second mode of operation.

22. The method of claim 1, wherein the hardware is capable of a read-modify-write operation to merge data from the at least one logical register with results of an operation.

23. The method of claim 22, wherein the merging includes merging a first or second adjacent logical register with the results of the operation based on a bit of the first and the second adjacent logical registers.

24. A system, comprising:
   a renaming unit for performing a register renaming operation based at least in part upon a mode indicator utilizing hardware corresponding to a processor for operating in at least two modes, including a first mode for operating the hardware using a logical register of a first bit width and a second mode for operating the hardware using a logical register of a second bit width, wherein the register renaming operation depends on the operating mode of the hardware; and
   the processor for operating on instructions based at least in part upon the mode indicator such that the instructions are operated on at a first precision when in the first mode and the instructions are operated on at a second precision when in the second mode, and when executing a plurality of threads, a first thread operates in the first mode with the first precision based at least in part upon the mode indictor included for the first thread and a second thread operates in the second mode with the second precision based at least in part upon the mode indicator included for the second thread.

25. The system of claim 24, wherein the hardware includes the processor coupled to memory via a bus.

26. A computer program product embodied on a computer readable medium having executable code to execute a process using a processor, the process comprising:

operating hardware in at least two modes including a first mode for operating the hardware using a logical register of a first bit width and a second mode for operating the hardware using a logical register of a second bit width, wherein the hardware operates on instructions based at least in part upon a mode indicator such that the instructions are operated on at a first precision when in the first mode and the instructions are operated on at a second precision when in the second mode, and when executing a plurality of threads, a first thread operates in the first mode with the first precision based at least in part upon the mode indictor included for the first thread and a second thread operates in the second mode with the second precision based at least in part upon the mode indicator included for the second thread; and performing a register renaming operation based at least in part upon the mode indicator, wherein the register renaming operation depends on the operating mode of the hardware and the act of performing comprises renaming at least one logical register to at least one physical register of the first bit width when in the first mode for operating the hardware.

27. The product of claim 26, wherein the first thread executes in the first mode of operation simultaneously with the second thread executing in the second mode of operation.

28. The product of claim 26, wherein the hardware performs a read-modify-write operation to merge data from the at least one logical register with results of an operation.

* * * * *